United States Patent [19]

Fujimoto et al.

[11] Patent Number: 4,666,966

[45] Date of Patent: May 19, 1987

[54] POLYURETHANE COMPOSITION AND A STABILIZER THEREOF

[75] Inventors: Yoshihisa Fujimoto, Yokohama; Seizi Gotou; Yoshiharu Fujita, both of Moriyama, all of Japan

[73] Assignee: Asahi Kasei Kogyo Kabushiki Kaisha, Osaka, Japan

[21] Appl. No.: 838,839

[22] Filed: Mar. 12, 1986

[30] Foreign Application Priority Data

Mar. 26, 1985 [JP] Japan ................................. 60-59411

[51] Int. Cl.$^4$ ...................... C08K 5/26; C07D 303/40; C07C 127/15; C07C 127/17
[52] U.S. Cl. .................................... 524/114; 524/192; 549/551; 564/34
[58] Field of Search ..................... 564/34; 549/551; 524/114, 192; 528/52, 61, 64

[56] References Cited

U.S. PATENT DOCUMENTS

| | | | |
|---|---|---|---|
| 3,244,731 | 4/1966 | Winfield et al. | 549/551 |
| 3,377,308 | 4/1968 | Oertel et al. | 564/34 |
| 3,461,106 | 8/1969 | Oertel et al. | 528/61 |
| 3,536,663 | 10/1970 | Oertel et al. | 528/65 |
| 3,609,112 | 9/1971 | Schroeder et al. | 528/64 |
| 3,630,987 | 12/1971 | Thoma et al. | 564/34 |
| 3,640,937 | 2/1972 | Thoma et al. | 528/61 |
| 3,711,443 | 1/1973 | Thoma et al. | 528/64 |
| 3,912,680 | 10/1975 | Oertel et al. | 528/61 |
| 3,932,357 | 1/1976 | Schmitt et al. | 528/64 |

FOREIGN PATENT DOCUMENTS

| | | |
|---|---|---|
| 6510 | 2/1972 | Japan . |
| 48895 | 12/1972 | Japan . |
| 221355 | 12/1984 | Japan . |
| 223751 | 12/1984 | Japan . |

OTHER PUBLICATIONS

Hackh's Chemical Dictionary—4th edition, p. 141, (1972).

Primary Examiner—Veronica P. Hoke
Attorney, Agent, or Firm—Birch, Stewart, Kolasch & Birch

[57] ABSTRACT

A polyurethane composition comprising an effective amount of a stabilizer compound represented by the general formula

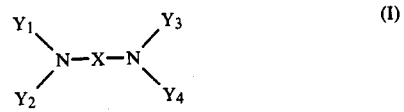

wherein, X is a residue represented the formula

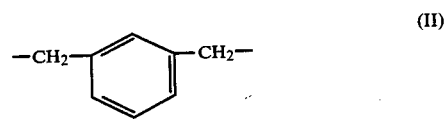

or

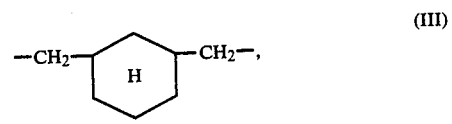

and at least three of $Y_1$, $Y_2$, $Y_3$, and $Y_4$ are residues represented by the general formula

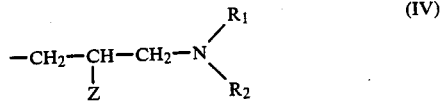

wherein $R_1$ and $R_2$ are each an alkyl or aralkyl group with the proviso that at least one of $R_1$ and $R_2$ is attached through its primary carbon to the nitrogen atom and the total number of carbon atoms of $R_1$ and $R_2$ is at least 4, the other one of $Y_1$, $Y_2$, $Y_3$, and $Y_4$, if present, is a glycidyl derivative residue, and Z is a residue represented by the general formula (Abstract continued on next page.)

(V)

wherein $R_3$ and $R_4$ are the same or different and represent each an alkyl group of 1 to 4 carbon atoms, thereby at least three residues Z represented by the general formula (V) are contained in the compound represented by the general formula (I), and a stabilizer for polyurethane compositions represented by said general formula (I).

11 Claims, 4 Drawing Figures

POLYURETHANE COMPOSITION AND A STABILIZER THEREOF

BACKGROUND OF THE INVENTION

1. Field of the Invention

The present invention relates to a polyurethane composition which is stabilized to light-induced embrittlement and to discoloration or change caused by combustion gas as well as atmospheric conditions, and is improved in dyeability. In addition, the composition retains these high performance characteristics against treatments as such end-product processing, dyeing, commercial dry cleaning, and the like. Accordingly, the present composition is utilizable for a wide variety of polyurethane articles including elastic foams, elastic fibers, synthetic leather, etc.

2. Description of the Prior Art

Japanese Patent Publication No. 6510/72 discloses that a phenolic compound having a specific constitution and molecular weight acts as an antioxidant for polyurethane, depresses the coloration thereof caused by smoggy air, and is scarcely extractable from polyurethane fibers with perchloroethylene, a commercial dry cleaning solvent. Japanese Patent Publication No. 48895/72 also discloses that polyurethane compositions, not only improved in dyeability but which are also markedly stabilized against the yellowing caused by ultraviolet rays or by harmful gas, can be obtained by incorporating a stabilizer polyurethane which contains a restricted tertiary amine structure having a specific constitution and molecular weight. Moreover, Japanese Patent Application Laid-Open Nos. 221355/84 and 223751/84 disclose that polyurethane compositions markedly improved in dyeability and in gas resistance can be obtained by incorporating a stabilizer polyurethane which contains a tertiary amine structure different from the above having a specific constitution and molecular weight with a specific terminal structure. The light stability of these compositions can be improved synergistically by joint use of an antioxidant and a light stabilizer.

In any of these prior art compositions, a polymer having the repeating unit of a low molecular compound is used as a stabilizer. The molecular weight of the polymeric stabilizer is defined but it is an average value, that is, the stabilizer has some molecular weight distribution. Accordingly, these stabilizers contain low-molecular fractions which, during the fiber making process, are liable to bleed out on the fiber surface and form scum. In addition, the low-molecular fractions tend to be lost during the processing or dry cleaning of the fibers. The stabilizers also contain high molecular fractions which have poor stabilizing effects. Even when the stabilizer of the most desirable average molecular weight is chosen, it is inevitable that the stability of the polyurethane fibers is remarkably lowered by subjecting them to processing, for example, dyeing under common conditions of pH 4 and a temperature near to 100° C. or commercial dry cleaning.

Consequently there is still a strong demand for an excellent polyurethane composition and stabilizer therefor that can solve these problems.

SUMMARY OF THE INVENTION

An object of the invention is to provide a stable polyurethane composition.

Another object of the invention is to provide a stabilizer for polyurethane compositions which has excellent characteristics.

Other objects of the invention will be apparent from the following detailed description of the embodiments.

In view of the above, the present inventors have made intensive studies, and as a result, found that novel compounds consisting of relatively large molecules represented by the following general formula (I) are excellent as stabilizers for polyurethane, and that polyurethane compositions containing these compounds have superior properties to those of the prior art compositions.

In this formula, X is a residue represented by the following formula (II) or (III), at least three of $Y_1$, $Y_2$, $Y_3$, and $Y_4$ are residues represented by the following general formula (IV), and the other one, if present, is a glycidyl derivative residue:

In formula (IV); $R_1$ and $R_2$ are each an alkyl or aralkyl group, at least one of $R_1$ and $R_2$ is attached through its primary carbon to the nitrogen atom, and the total number of carbon atoms of $R_1$ and $R_2$ is at least 4; and Z is a residue represented by the following general formula (V), thereby at least three residues Z represented by the general formula (V) are contained in the compounds represented by the general formula (I).

In formula (V), $R_1$ and $R_4$ are the same or different and each represent an alkyl group of 1 to 4 carbon atoms.

The stabilizer of the present invention is capable of improving polyurethane to a great extent in the resistance to gas-caused yellowing and to light-induced embrittlement. When the stabilizer is used jointly with other types of antioxidant and light stabilizer, the resistance to light-induced embrittlement can be enhanced remarkably by synergy. In addition, these stabilizing effects are scarcely lost by treatments such as dyeing and commercial dry cleaning. Moreover the dyeability is enhanced with the stabilizer to a level comparable to those of the known prior art compositions containing tertiary amine groups.

As can be seen particularly from the results of Example 2 of the present invention and Comparative Example 1, the polyurethane composition of the invention has greatly improved light stability and excellent resistance to gas-caused yellowing, as compared with stabilizer-free polyurethane compositions and with those containing well-known prior art stabilizers. The polyurethane composition of the invention exhibits the feature of well-withstanding a harsh treatment such as dry cleaning, while retaining these excellent properties. Further, as can be seen from the results of Example 3 and Comparative Example 2, the present polyurethane composition is synergistically improved in light stability by addition of other types of antioxidants and light stabilizers. The synergistically enhanced stability also is retained without deterioration by such a harsh treatment as dry cleaning. These features of the present polyurethane composition have been scarcely found in the properties of well-known prior art polyurethane compositions. Therefore, polyurethane articles superior in practicality and scarcely degradable can be obtained according to the present invention.

DESCRIPTION OF THE PREFERRED EMBODIMENTS

The stabilizer compound of the present invention can be produced with ease, for example, in the following way: The epoxy groups of N,N,N',N'-tetraglycidylxylylenediamine (supplied by Mitsubishi Gas Chemicals Inc. under the tradename of Tetrad-Y) (hereinafter designated as TGX) or 1,3-bis(N,N-diglycidylaminomethyl)cyclohexane (supplied by the same company under the tradename of Tetrad-D) (hereinafter designated as TGH) are reacted with an equivalent amount of a dialkylamine to prepare a compound represented by the general formula wherein X, $R_1$, and $R_2$ have the same meaning as in formulae (II), (III), and (IV). Then the compound of formula (VI) and isophoronediisocyanate are reacted in a molar ratio of 1:4, that is, the hydroxyl groups of the compound of formula (VI) is reacted with the more reactive one of the two isocyanate groups of isophorone diisocyanate, to prepare a compound represented by the following general formula (VII):

Then the isocyanate groups of the compound of formula (VII) are reacted with an equivalent amount of an N,N-dialkylhydrazine to yield a compound of the present invention.

The tetrafunctional epoxy compounds TGX and TGH used in the invention are obtained by the reaction of methaxylylene diamine with epichlorohydrin and the reaction of 1,3bis(aminomethyl)cyclohexane with epichlorohydrin, respectively. Other tetrafunctional epoxy compounds may be produced by the reaction of epichlorohydrin with other aliphatic diamines, for example, ethylenediamine, hexamethylenediamine, isophoronediamine, bis(3-aminopropyl)ether, p-xylylenediamine, and 1,4-bis(aminomethyl)cyclohexane, and may be used similarly to TGX and TGH as raw materials for stabilizer compounds of the present invention. Those epoxy compounds, however, are hard to synthesize without unfavorable side reactions and hence are not suitable for practical use.

Suitable dialkylamines for the preparation of compounds of formula (VI) include secondary amines, for example, diethylamine, di-n-propylamine, N-methyl-N-isobutylamine, dimethylallylamine, di-n-butylamine, di(2-ethylhexyl)amine, dibenzylamine, and N-methyl-N-laurylamine. Dimethylamine and N-methyl-N-ethylamine are undesirable, because the resulting compounds represented by formula (VI), in the reaction thereof with isophoronediisocyanate, show marked tendencies to decrease the difference in reactivity between the two isocyanate groups of isophoronediisocyanate and hence are liable to undergo crosslinking during this reaction. Other dialkylamines undesirable because of their poor reactivities with the epoxy groups of TGX and TGH are compounds, e.g. diisopropylamine, di-sec-butylamine, and dicyclohexylamine, in which the nitrogen atom is linked to the secondary carbon atoms of both the alkyl groups, and those, e.g. N-methyl-N-t-butylamine, in which the nitrogen atom is linked to the tertiary carbon atom of one of the two alkyl groups. Dialkylamines having too many carbon atoms are also undesirable, because the stabilizer derived from such a dialkylamine has low concentrations of tertiary amine and semicarbazide residues and hence an excessive amount of the stabilizer is necessary for blending in order to achieve the intended effect. Thus, dialkylamines of up to about 20 carbon atoms are desirable. Specially preferred dialkylamines are di-n-butylamine, di(2-ethylhexyl)amine, and dibenzylamine. These dialkylamines may be used alone or in combination.

The diisocyanate used to react with the compound of formula (VI) needs to have a large difference in reactivity between the two isocyanate groups. Among such diisocyanates, isophoronediisocyanate is readily available.

Suitable N,N-dialkylhydrazines for the reaction with the compound of formula (VII) include, for example, N,N-diisopropylhydrazine and, N-methyl-N-ethylhydrazine. The alkyl group is preferably a lower alkyl having up to 4 carbon atoms. N,N-dimethylhydrazine is specially preferred. These N,N-dialkylhydrazines may be used alone or in combination.

The compound of the present invention contains generally 6 tertiary amine residues and 4 semicarbazide residues in the molecule, but the effect of the invention can be achieved even when five tertiary amine residues or three semicarbazide residues are contained therein. Accordingly, the compound can be reacted with glycidyl groups or isocyanate groups without adverse effects on the reaction of glycidyl groups with dialkylamines, or on the reaction of isocyanate groups with secondary alcohols or with N,N-dialkylhydrazines, and can therefore be utilized to give variation on the structure of the stabilizer compound of formula (I).

The polyurethane composition of the present invention is stabilized by physically mixing the stabilizer of formula (I) into an elastic polyurethane. Such polyurethanes are generally produced by reacting hydroxyl substituted polymers, such as polyester, polyether, and polycarbonate, of molecular weights from 600 to 3000 with a stoichiometrically excess of organic diisocyanate to prepare intermediate polymers having terminal isocyanate groups, followed by reacting the intermediate polymers with a compound, such as water, hydrazine, organic diamine, glycol, dihydrazide, or aminoalcohol, which have two active hydrogen atoms in the molecule, thereby extending the polymer chains. These segmented polyurethanes having urethane bonds in the molecule are generally well known in the art.

In the present invention, the amount of the stabilizer in such a polyurethane is desired to be in an amount necessary to attain the intended resistance to light-induced embrittlement and to gas-caused yellowing. More than this amount is undesirable since it will bring about side effects. Generally suitable amounts of the stabilizer are such that the total concentration of the tertiary amine and semicarbazide residues becomes 10 to 400 milliequivalents/kg polymer. When the total concentration is less than said lower limit, the effect of the present invention cannot be achieved. Preferably the total concentration is from 30 to 150 milliequivalents/kg polymer.

If desired, it is possible to additionally incorporate an antioxidant such as a hindered phenol or amine type of antioxidant and/or an ultraviolet absorber such as a benzotriazole type of ultraviolet absorber into the composition of the present invention. Surprisingly, the incorporation of these additives synergistically improve the composition of the present invention in the stability to light-induced embrittlement and sometimes in the stability to gas-caused yellowing.

The composition of the present invention may further contain a pigment and other common additives, as desired.

The following examples illustrate preferred embodiments of the present invention.

EXAMPLE 1

Preparation of stabilizer

The preparation process, divided into three steps, is described below. In the first step, a 500-ml flask equipped with a stirrer was fed with each of TGX and TGH and each of various dialkylamines (including a mixture of two dialkylamines) in an amount equivalent to the epoxy groups of the charged TGX or TGH. The air in the flask was replaced by nitrogen gas, the flask was sealed, and the reaction was conducted with stirring at a temperature for a period of time as shown in Table 1.

TABLE 1

| No. | Symbol | Feedstock for reaction | Temp. (°C.) | Time (hr) |
|---|---|---|---|---|
| 1 | A-1 | TGX$^{(a)}$ + Diethylamine | 70 | 24 |
| 2 | A-2 | TGX + Di-n-butylamine | 125 | 7 |
| 3 | A-3 | TGX + Diisobutylamine | 150 | 7 |
| 4 | A-4 | TGX + Di(2-ethylhexyl)amine | 150 | 16 |
| 5 | A-5 | TGH$^{(b)}$ + Di(2-ethylhexyl)amine | 150 | 24 |
| 6 | A-6 | TGX + Dibenzylamine | 125 | 7 |
| 7 | A-7 | TGH + Dibenzylamine | 150 | 7 |
| 8 | A-8 | TGX + Dibenzylamine + Ethylcellosolve$^{(c)}$ | 125 | 7 |

Notes
$^{(a)}$TGX = N,N,N',N'—tetraglycidyl-m-xylylene-diamine
$^{(b)}$TGH = 1,3-Bis(N,N—diglycidylaminomethyl)-cyclohexane
$^{(c)}$TGX (4 equivalents of epoxy) to Dibenzylamine (3 equivalents to the whole epoxy of TGX) and Ethylcellosolve (1 equivalent to the whole epoxy of TGX)
(Ethylcellosolve = $C_2H_5$ $OC_2H_4OH$, i.e., ethylene glycol monoethyl ether).

In the second step, isophoronediisocyanate was added to the reaction mixture obtained in the first step (molar ratio of isophoronediosocyanate to produced secondary alcohol residues=1:1) and heating with stirring was further continued. The reaction was conducted at 70° C. for 3 hours in case of A-1 (symbol in Table 1), at 90° C. for 2.5 hours in case of A-2, and at 95° C. for 2.5 hours in cases of A-3 to A-8. Then a suitable amount of dimethylacetamide was added, and the reaction mixture was cooled to 60° C.

In the third step, a 40% dimethylacetamide solution of N,N-dimethylhydrazine (an amount equivalent to the isocyanate groups remaining in the reaction product of the second step) but, in case of A-8, N,N-dimethylhydrazine (¾ equivalent) and t-butylamine (¼ equivalent), was added to the reaction mixture obtained in the second step, and stirring was continued for 20 minutes.

Figure 1:
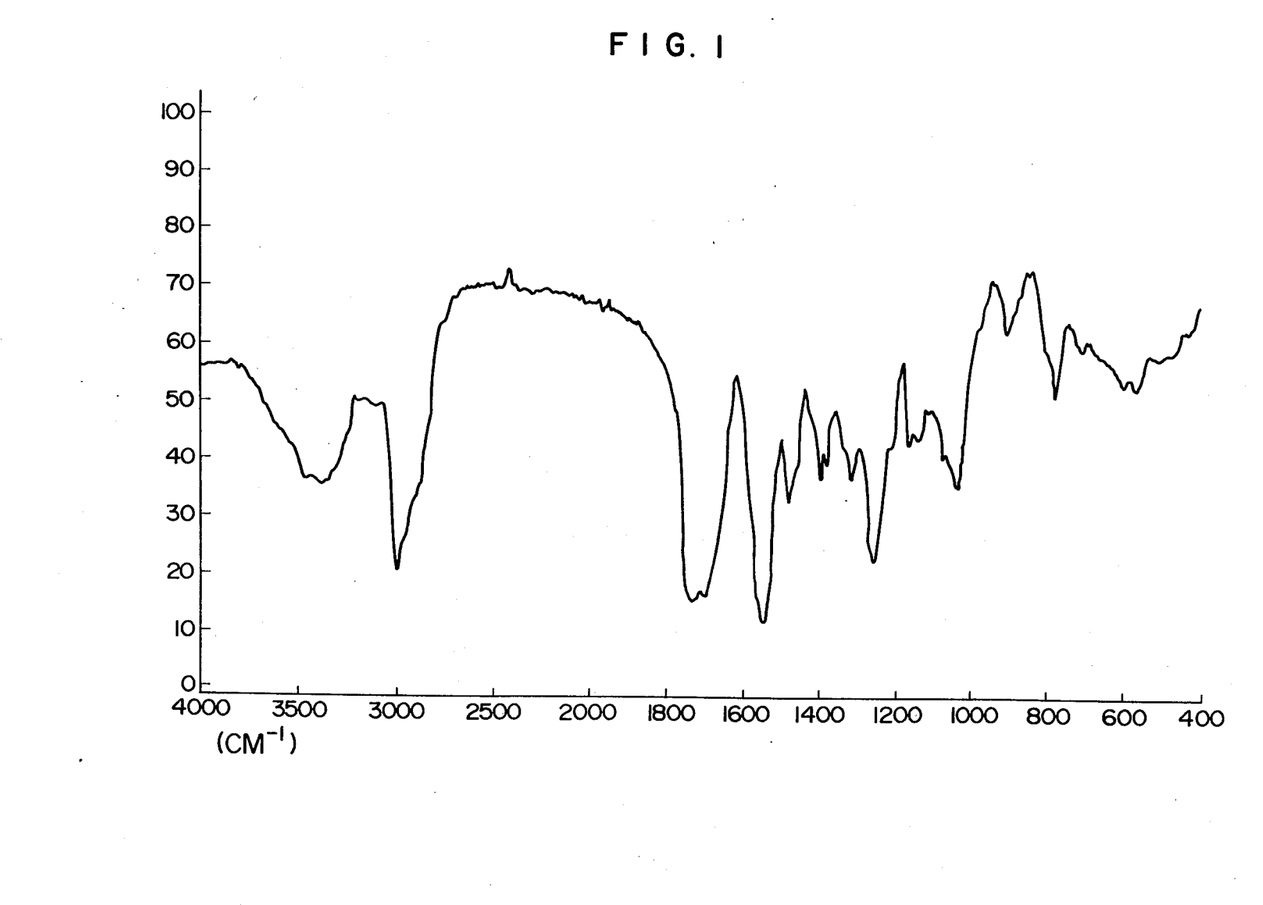
FIGS. 1, 2, 3, and 4 show infrared absorption spectra of typical stabilizer compounds of the present invention.
Figure 2:
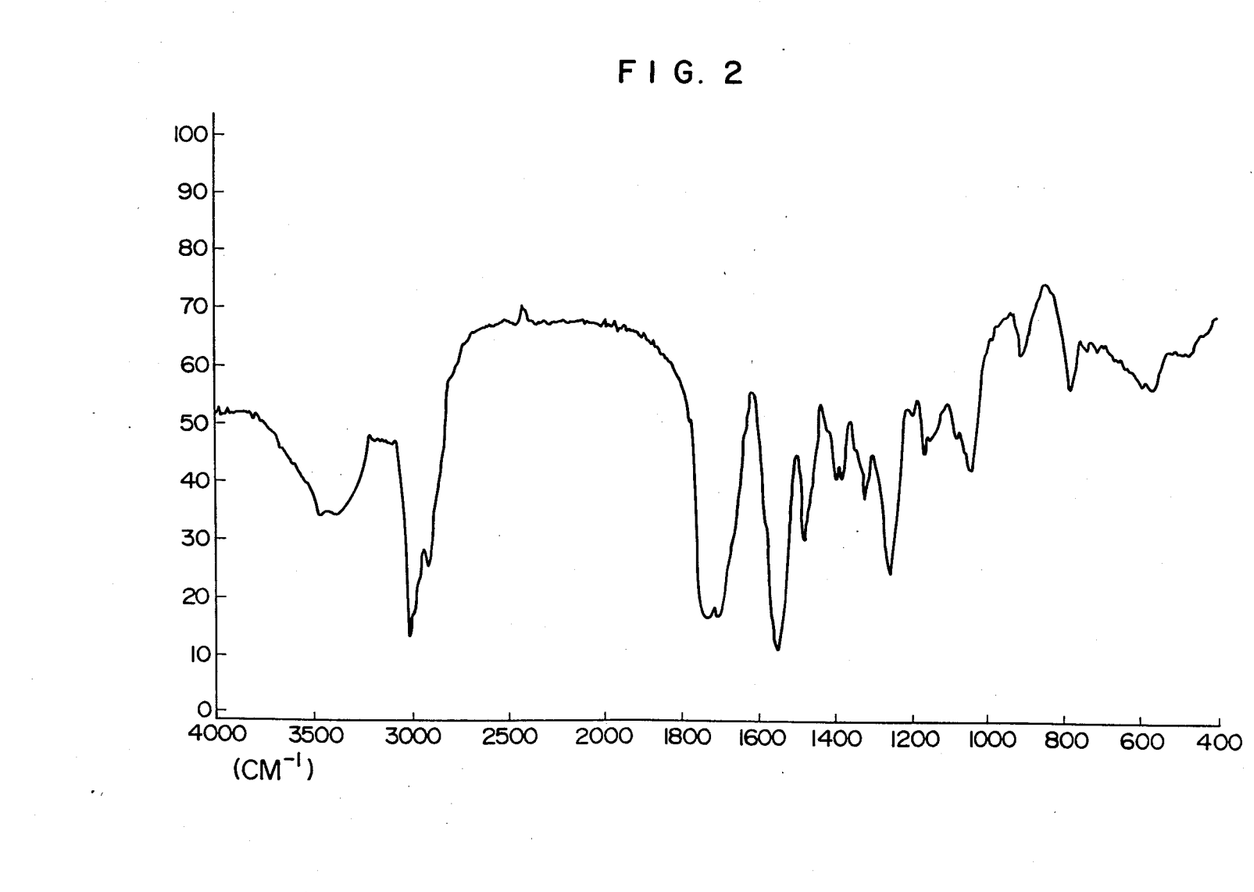
Figure 3:
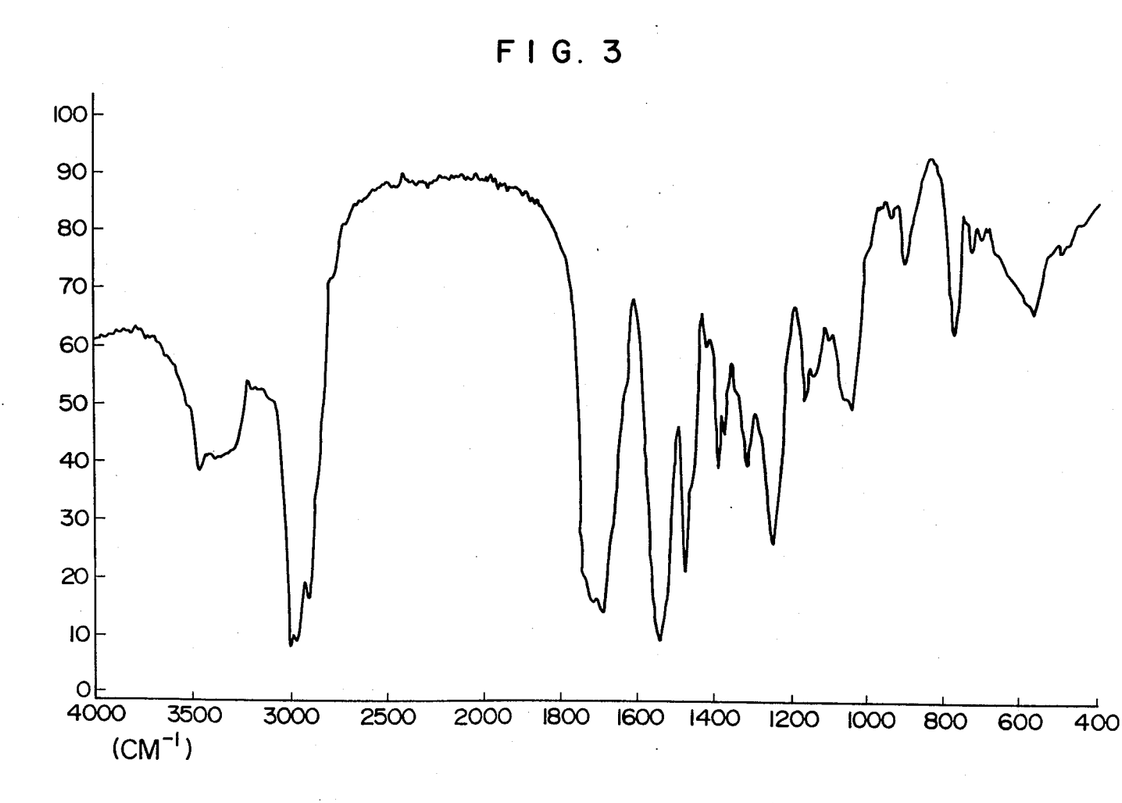
Figure 4:
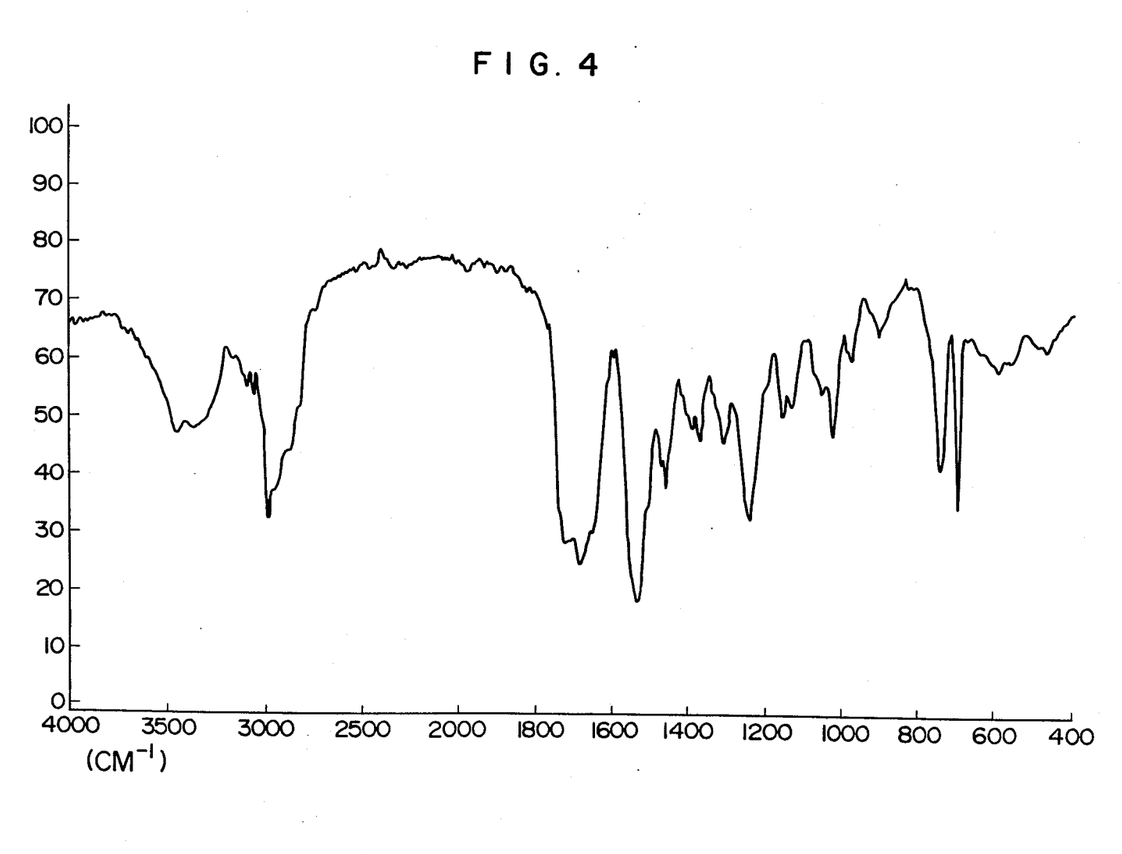

Each of the thus obtained stabilizer solutions corresponding to A-1, A-2, A-4, and A-6 was poured into water with stirring to precipitate the stabilizer, which was then thoroughly washed with water, and dried in vacuo at 50° C. for 20 hours. The thus obtained compounds were measured for infrared absorption spectra and melting points. Results of the infrared spectrometry are shown in FIGS. 1-4. The melt point measurement was conducted by using an apparatus supplied by Mitamura Riken Co., Ltd. (model 7-12). The results were as follows:

| Stabilizer corresponding to A-1 | 114° C. |
|---|---|
| Stabilizer corresponding to A-2 | 94° C. |
| Stabilizer corresponding to A-4 | 91° C. |
| Stabilizer corresponding to A-6 | 55° C. |

EXAMPLE 2

Stabilizers from Example 1 was each added to a polyurethane solution described below so that the total concentration of tertiary amine and semicarbazide residues would become 100 milliequivalents/kg polymer, and 40-denier fibers were made from the mixture in the manner described below. The obtained fibers were found to have satisfactory physical properties for use. Then these fibers, after pretreatment as described below, were evaluated for light resistance and resistance to gas-caused yellowing in the manner described below. Results of the evaluation are shown in Table 2, wherein symbol numbers corresponding to those shown in Table 1, indicate each the composition containing the stabilizer prepared from the corresponding feedstock shown in Table 1.

Preparation of Polyurethane Solution 1000 parts by weight (hereinafter parts by weight are abbreviated as parts) of polytetramethylene glycol of average molecular weight 1600 and 250 parts of 4,4'-diphenylmethanediisocyanate were reacted with stirring at 80° C. under a stream of nitrogen gas to give a prepolymer having isocyanate groups at both ends of the molecule. This prepolymer was dissolved in 1800 parts of dimethylacetamide to form a homogeneous solution, which was then added to a solution of 24.4 parts ethylenediamine and 2.2 parts diethylamine in 1100 parts dimethylacetamide at room temperature. The reaction proceeded quickly, giving a highly viscous solution having a viscosity of 2800 poises at 30° C. Further, 57.45 parts of titanium oxide containing a small amount of a blue-tingeing dye and 164 parts of dimethylacetamide were mixed to thorough dispersion, and added gradually to the above solution with sufficient stirring, yielding a highly viscous solution having a viscosity of 2070 poises at 30° C. This solution is designated as dope A.

Preparation of polyurethane fibers

Various stabilizers (obtained in Example 1) of the present invention were each added to a portion of dope A with stirring to form a uniform solution. The solution was degassed in vacuo to remove bubbles and then discharged through spinneret holes into an atmosphere of about 200° C. to spin fibers. Their drying, false twisting, oiling, and winding-up at a speed 500 n/m gave 40-denier fibers.

Treatment of fibers

Two treatments designated as treatment A and treatment B were conducted. Treatment A is a wash, wherein 40-denier polyurethane fibers in a 50% stretched state under tension are immersed in boiling water for 1 hour, then washed in aqueous solution of a detergent (tradename: New Beads) (concentration 1.3 g/l) at 40° C. for 40 minutes, rinsed with water, and dried at 45° C. for 15 minutes.

Treatment B is a combination of dyeing and dry cleaning, wherein 40-denier polyurethane fibers in a 50% stretched state under tension are immersed in a boiling dyeing bath for 1 hour. The dyeing bath is composed of 1.2 wt% of a dye (tradename: Blankophor CL), 0.5 g/l of ammonium acetate, and acetic acid (a concentration necessary to make the pH 4.0 at room temperature). Then the fibers are rinsed with city water in its stream for 20 minutes, dried at 40° C. for 30 minutes, then immersed in perchloroethylene at 25° C. for 2 hours, and dried at 30° C. for 30 minutes.

Tests for resistance to light-induced embrittlement and to gas-caused yellowing The test for the resistance to light-induced embrittlement was conducted as follows: 40-denier fibers without stretch are fixed on a white thick paper, and irradiated in a Fade-O-Meter (model FAL-3, supplied by Suga Shikenki Co., Ltd.). Tensile strength of the irradiated sample is measured at a strain rate of 1000%/min by using a tensile tester (model VTM-3, supplied by Toyo-Baldwin Co., Ltd.).

The degree of light-induced embrittlement was represented by the time for halving the tensile strength (hereinafter this time is designated as $\tau_{\frac{1}{2}}$), determined from the relation between the irradiation period and the retention of strength.

The yellowing caused by NOx gas was examined by using the three units respectively with an accelerating test in accordance with JIS L 0855-1976. The yellowing caused by combustion gas was tested in accordance with AATCC-23.

The degrees of yellowing were evaluated by visual observation and ranked into the following classes: class 1—yellow-brown colored, class 2—yellow colored, class 3—pale yellow colored, class 4—slightly colored, and class 5—colorless. When the tinctorial strength was at the middle of two adjoining classes, its rank was expressed by (the number of the higher class-0.5).

COMPARATIVE EXAMPLE 1

A non-segmented polyurethane which is a known stabilizer, containing tertiary amine structure was prepared as follows:

Reaction was carried out by adding 0.05 ml of dibutyltin diacetate to a mixture of 150 g of 4-t-butyl-4-aza-2,6-heptanediol, 175 g of 4,4'-methylenedicyclo hexyldisocyanate, and 210 g of N,N-dimethylacetamide with stirring at room temperature, and continued stirring at 70° C. for 90 minutes.

The thus obtained non-segmented polyurethane (hereinafter designated as TBC) was mixed in a polyurethane solution (the same as used in Example 2) so that the concentration of tertiary amine residues would become 100 milliequivalents/kg polymers. Then polyurethane fibers were prepared from the above mixture, treated, and tested, in the same manner as in Example 2. Results of the test are shown in Table 2. In addition, fibers were prepared from a polyurethane solution containing no stabilizer, and performance characteristics of the fibers were evaluated.

resistance and resistance to gas-caused yellowing on the obtained fibers are shown in Table 3.

COMPARATIVE EXAMPLE 2

The same amount of the same hindered phenolic antioxidant CCB as used in Example 3 was incorporated into the polymer solution prepared in Comparative Example 1. Fibers were formed from this polymer solution, and tested for light resistance and resistance to

TABLE 2

|  | Stabilizer | Light resistance $\tau \frac{1}{2}$ (hr) | | Degree of yellowing JIS L 0855-1976 | | Degree of yellowing AATCC-23 | |
| --- | --- | --- | --- | --- | --- | --- | --- |
|  |  | Treatment A | Treatment B | Treatment A | Treatment B | Treatment A | Treatment B |
| Example 2 | B-1 | 5 | 4 | 4 | 3 | 3 | 3 |
|  | B-2 | 8 | 5 | 4 | 4 | 3.5 | 3.5 |
|  | B-3 | 10 | 7 | 3.5 | 3.5 | 4 | 4 |
|  | B-4 | 12 | 9 | 4 | 4 | 4 | 4 |
|  | B-5 | 12 | 8 | 4 | 4 | 4 | 4 |
|  | B-6 | 20 | 12 | 4 | 3.5 | 4.5 | 4.5 |
|  | B-7 | 13 | 10 | 4 | 3.5 | 4.5 | 4.5 |
|  | B-8 | 16 | 8 | 4 | 3.5 | 4 | 4 |
| Comparative Example 1 | Known stabilizer TBC | 5 | 1 | 4 | 3 | 3 | 3 |
|  | No stabilizer | 3 | 2 | 1 | 1 | 1.5 | 1.5 |

It can be seen from Table 2 that fibers formed from the polyurethane composition of the present invention are excellent in light resistance, particularly superior in light resistance remaining after treatment with perchloroethylene, i.e. after treatment B, said light resistance being a problem of polyurethane fibers containing the prior art stabilizer. It is also revealed that polyurethane fibers according to the present invention are good in resistance to gas-caused yellowing.

EXAMPLE 3

Stabilizers of the present invention were each incorporated, similarly to Example 2, in a polyurethane solution so that said concentration would become 100 milliequivalents/kg polymer. To the resulting mixtures was added a hindered phenolic antioxidant of molecular weight about 2500 produced by reacting isobutylene gas with a p-cresol-dicyclopentadiene condensation product (hereinafter this antioxidant is designated as CCB). Fibers were prepared from the resulting polyurethane solutions. Further, fibers were formed similarly but without addition of CCB. Results of testing light gas-caused yellowing. Results of the tests are shown in Table 3.

TABLE 3

|  | Stabilizer | Antioxidant | Light resistance $\tau \frac{1}{2}$ (hr) | | Degree of yellowing JIS L 0855-1976 | | Degree of yellowing AATCC-23 | |
| --- | --- | --- | --- | --- | --- | --- | --- | --- |
|  |  |  | Treatment A | Treatment B | Treatment A | Treatment B | Treatment A | Treatment B |
| Example 3 | B-4 | CCB | 47 | 23 | 4 | 4 | 4 | 4 |
|  | B-5 | CCB | 44 | 21 | 4 | 3.5 | 4 | 4 |
|  | B-6 | CCB | 43 | 22 | 3.5 | 3.5 | 4 | 4.5 |
|  | B-7 | CCB | 40 | 21 | 4 | 3.5 | 4.5 | 4.5 |
| Comparative Example 2 | Known stabilizer TBC | CCB | 29 | 6 | 3.5 | 2.5 | 3 | 3 |
|  | None | CCB | 20 | 5 | 1 | 1 | 2 | 2 |
| Example 2 | B-4 | None | 12 | 9 | 4 | 4 | 4 | 4 |
|  | B-5 | None | 12 | 8 | 4 | 4 | 4 | 4 |
| Comparative Example 1 | Known stabilizer TBC | None | 5 | 1 | 4 | 3 | 3 | 3 |

It can be seen from Table 3 that the stabilizer of the present invention when used jointly with an antioxidant (Example 3), exhibits a synergistic effect of improving the light resistance, that is, the effect in this case is greater than the expected effects produced by the separate uses of the stabilizer and the antioxidant. In contrast, the known prior art stabilizer of Comparative Example 2 proves to produce a simple summation of the effects.

What is claimed is:

1. A polyurethane composition comprising an elastic polyurethane and an effective amount, to improve the resistance of the polyurethane to gas-caused yellowing and light-induced embrittlement, of a stabilizer compound represented by the formula (I)

wherein, X is a radical represented by the formula or and at least three of $Y_1$, $Y_2$, $Y_3$, and $Y_4$ are radicals represented by the formula wherein $R_1$ and $R_2$ are each an alkyl or aralkyl group with the proviso that at least one of $R_1$ and $R_2$ is attached through its primary carbon to the nitrogen atom and the total number of carbon atoms of $R_1$ and $R_2$ is at least 4, the other one of $Y_1$, $Y_2$, $Y_3$, and $Y_4$, if present, is a glycidyl radical which is capable of being reacted with $C_2H_5OC_2H_4OH$, and Z is a radical represented by the formula wherein $R_3$ and $R_4$ are the same or different and represent each an alkyl group of 1 to 4 carbon atoms, thereby at least three radicals Z are contained in the compound represented by the formula (I).

2. The polyurethane composition of claim 1, wherein the total number of carbon atoms of $R_1$ and $R_2$ in formula (IV) is from 4 to 20.

3. The polyurethane composition of claim 1, wherein $R_3$ and $R_4$ in formula (V) are the same or different alkyl groups of 1 to 2 carbon atoms.

4. The polyurethane composition of claim 1, wherein $R_3$ and $R_4$ in formula (V) are methyl groups.

5. The polyurethane composition of claim 1 which further comprises an antioxidant and/or an ultraviolet absorber.

6. The composition of claim 1 wherein the amount of the stabilizer is such that the total concentration of the tertiary amine and semicarbazide radical in the stabilizer is from 10 to 400 milliequivalent/kg of the polyurethane.

7. The composition of claim 1 wherein the amount of the stabilizer is such that the total concentration of the tertiary amine and semicarbazide radical in the stabilizer is from 30 to 150 milliequivalents/kg of the polyurethane.

8. A compound represented by the formula wherein, X is a radical represented by the formula or and at least three of $Y_1$, $Y_2$, $Y_3$, and $Y_4$ are radicals represented by the formula wherein $R_1$ and $R_2$ are each an alkyl or aralkyl group with the proviso that at least one of $R_1$ and $R_2$ is attached through its primary carbon to the nitrogen atom and the total number of carbon atoms of $R_1$ and $R_2$ is at least 4, the other one of $Y_1$, $Y_2$, $Y_3$, and $Y_4$, if present, is a glycidyl radical which is capable of being reacted with $C_2H_5OC_2H_4OH$, and Z is a radical represented by the formula wherein $R_3$ and $R_4$ are the same or different and represent each an alkyl group of 1 to 4 carbon atoms, thereby at least three radicals Z are contained in the compound represented by the formula (I).

9. The compound for polyurethane compositions according to claim 8, wherein the total number of carbon atoms of $R_1$ and $R_2$ in formula (IV) is from 4 to 20.

10. The compound for polyurethane compositions according to claim 8, wherein $R_3$ and $R_4$ in formula (V) are the same or different alkyl groups of 1 to 2 carbon atoms.

11. The compound for polyurethane compositions according to claim 8, wherein $R_3$ and $R_4$ in formula (V) are methyl groups.

* * * * *